United States Patent
Chang

(10) Patent No.: US 8,081,259 B2
(45) Date of Patent: Dec. 20, 2011

(54) MODULATING OPERATION INTERFACE AND METHOD THEREOF

(75) Inventor: Hui-Pin Chang, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 1401 days.

(21) Appl. No.: 11/552,833

(22) Filed: Oct. 25, 2006

(65) Prior Publication Data

US 2008/0117331 A1 May 22, 2008

(30) Foreign Application Priority Data

Dec. 8, 2005 (TW) .............................. 94143470 A

(51) Int. Cl.
*H04N 5/50* (2006.01)
(52) U.S. Cl. ........................................ 348/569; 715/828
(58) Field of Classification Search ................ 348/569, 348/570, 554, 555; 345/184; 715/857
See application file for complete search history.

(56) References Cited

U.S. PATENT DOCUMENTS

| | | | | |
|---|---|---|---|---|
| 5,986,638 A | * | 11/1999 | Cheng | 715/857 |
| 7,134,095 B1 | * | 11/2006 | Smith et al. | 715/860 |
| 7,595,840 B2 | * | 9/2009 | Hsieh | 348/569 |
| 2004/0217940 A1 | * | 11/2004 | Huang | 345/157 |

FOREIGN PATENT DOCUMENTS

| | | |
|---|---|---|
| CN | 1453997 A | 11/2003 |
| CN | 200410007355.X A | 11/2004 |
| JP | 9114626 A | 5/1997 |
| JP | 2002185599 A | 6/2002 |

* cited by examiner

*Primary Examiner* — Michael Lee

(57) ABSTRACT

A modulating operation interface and a method are applied for a display apparatus. The modulating operation interface comprises a display unit, a selection unit, a clock unit and a processor. A circle broadcast action of a plurality of operation diagrams is displayed by the display unit. One operation diagram from the plurality of operation diagrams broadcasted by the display unit is then selected by the selection unit. An internal menu of lower level is expanded from the selected operation diagram. The circle broadcast action executed by the display unit is controlled by the processor based on a predetermined time and a time data provided by the clock unit. Accordingly, the modulation can be finished completely and speedily while modulating the modulating operation interface.

20 Claims, 7 Drawing Sheets

MODULATING OPERATION INTERFACE
AND METHOD THEREOF

FIELD OF THE INVENTION

The present invention relates to a modulating operation interface and method thereof, and more particularly to a modulating operation interface and a method applied for a display apparatus.

BACKGROUND OF THE INVENTION

In the past, a user had to use a knob disposed at the bottom of the housing of a display apparatus to change the brightness, contrast, vertical/horizontal width and vertical/horizontal position of a screen, when the user needed to adjust the screen of the display apparatus. As the technology for adjusting the screen of a display apparatus advances, manufacturers have developed a display apparatus with an on screen display (OSD) function, and there are additional screen adjusting parameters set by an on screen display (OSD), and these parameters include vertical/horizontal ripple, rotate, color, zoom in/out, and demagnetize. If a user presses a function key at the bottom of the housing of the display apparatus, the display apparatus will show a modulating window on the screen, and the modulating window includes a plurality of screen modulating parameters, such that if a user uses a function key disposed at the bottom of the housing of a display apparatus to control the OSD to select the required screen adjusting parameters, the screen of the display apparatus can be adjusted by such screen adjusting parameters.

If a user wants to adjust the screen of a display apparatus in accordance with a prior art, the screen will show a menu on the screen for users to select an option, and then will show a detail menu and a parameter setup, so as to complete the modulating operation. However, the foregoing procedure occupies a relatively large area of the screen, which may easily confuse the users and cause inconvenience to the application.

Therefore, a modulating operation interface and method thereof are designed, and a display unit and a clock unit are used for managing the on screen display (OSD) function, such that when user want to adjust the screen of a display apparatus, the modulating operation can be completed quickly and clearly

SUMMARY OF THE INVENTION

It is a primary objective of the present invention is to provide a modulating operation interface and a method applied for a display apparatus, such that the modulating operation can be completed quickly and clearly when the screen of a display device is adjusted.

To achieve the foregoing objective, the modulating operation interface in accordance with the present invention used for a display apparatus comprises a display unit, a selection unit and a clock unit. The display unit broadcasts a circle broadcast action of a plurality of operation diagrams. The operation diagram is an on screen display (OSD). The selection unit is provided for performing a selection action for an operation diagram of the foregoing circle broadcast action, and extending the selected operation diagram to an internal menu of a lower level. The selection unit is a press key disposed on the display apparatus or a wireless remote controller. Further, the selection action is also provided for making the internal menu of a lower level to show a detail menu for, and the detail menu is a layer display. The clock unit counts a predetermined time for controlling the circle broadcast action.

In the present invention, a method for modulating an operation interface is applied for a display apparatus, and the method comprises the steps of: using a clock unit to count a predetermined time; broadcasting a plurality of operation diagrams on a display unit based on a circle broadcast action; using a selection unit to perform a selection action on an operation diagram of the foregoing circle broadcast action; and driving the selected operation diagram to extend an internal menu of a lower level, so as to reduce the area occupied by the screen for managing the on screen display (OSD) functions.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
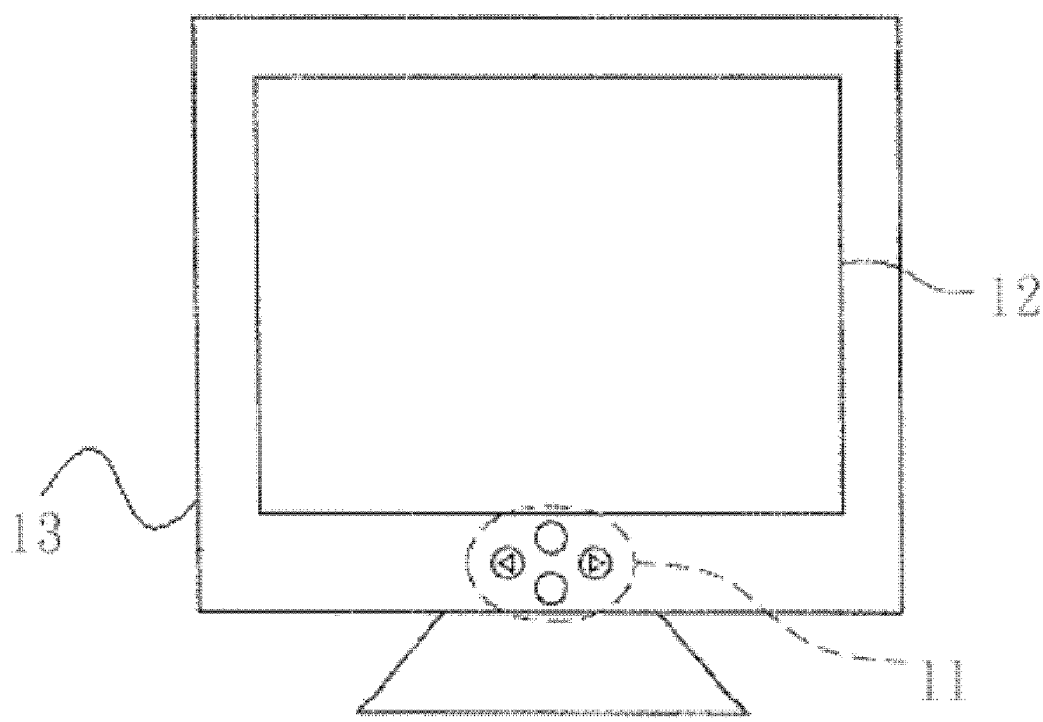
FIG. 1 is a schematic view of modulating an operation interface by a press button in accordance with the present invention.
Figure 2:
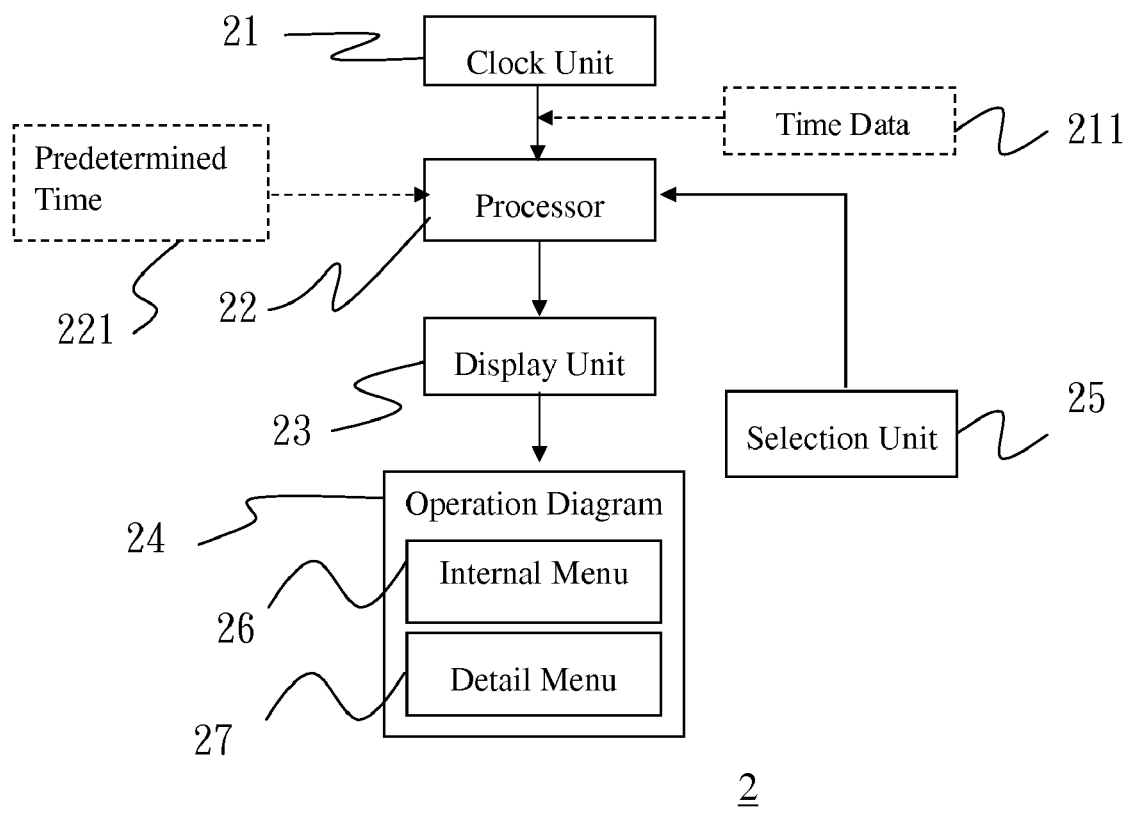
FIG. 2 is a schematic block diagram of a modulating operation interface in accordance with the present invention.

Referring to the related drawings for the description of a preferred embodiment of a modulating operation interface and method thereof in accordance with the present invention, FIG. 1 shows a schematic view of modulating an operation interface by a press button, and FIG. 2 shows a schematic block diagram of a modulating operation interface.

In FIG. 1, a computer apparatus 13 comprises a press button 11 and a screen 12, wherein the press button 11 is used for controlling a modulating operation interface, and the screen 12 is used for displaying the modulating operation interface 2. In FIG. 2, the modulating operation interface 2 comprises a clock unit 21, a processor 22, a display unit 23 and a selection unit 25. The clock unit 21 is used for providing a time data 211. The display unit 23 is used for displaying the circle broadcast action of a plurality of operation diagrams 24. The selection unit 25 is a press key disposed on the display apparatus or a wireless remote controller for providing a selection action of the modulating operation interface 2. The processor 22 controls the circle broadcast action of the operation diagram 24 based on a predetermined time 221 and a time data 211 and controls the selected operation diagram 24 to extend an internal menu 26 based on a selection action performed by the selection unit 25. In FIG. 2, the operation diagram 24 comprises at least one internal menu 26 and at least one detail menu 27. The internal menu 26 includes a modulation function for auto set, image set, menu setup and audio function. The auto set option is used for adjusting a horizontal position and a vertical position automatically. The image set option is used for adjusting an image width and a sharpness. The audio function option is used for adjusting Volume and Mute. The menu setup option is used for setting a language and a display time. In addition, the operation diagram 24 is an on screen display (OSD). The detail menu 27 includes detail functions of the internal menu 26 such as the muting function and the adjusting function for the audio function menu. The selection action drives the operation diagram 24 to display an internal menu 26, or drives the internal menu 26 to display the detail menu 27 of a layer display.

Figure 3:
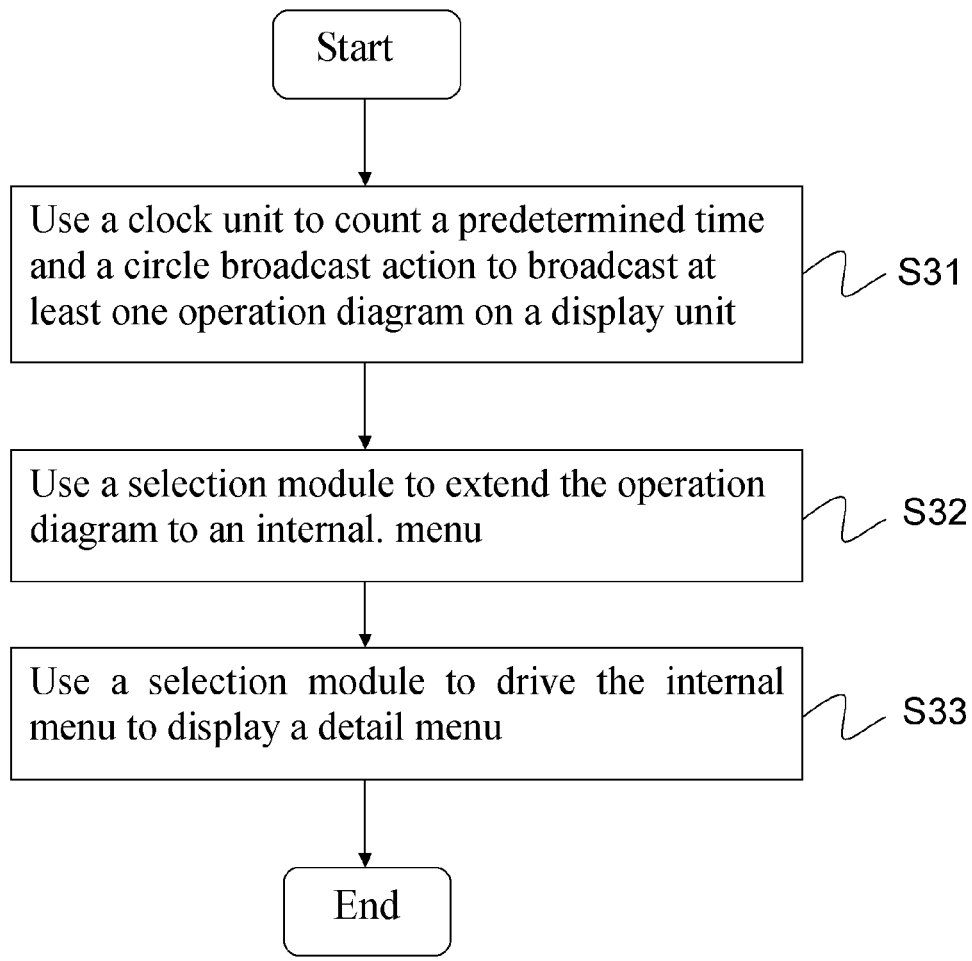
FIG. 3 is a flow chart of the operation in accordance with the present invention.

Referring to FIG. 3 for a flow chart of an operation in accordance with the present invention, the flow chart comprises the steps of: starting a procedure; using a clock unit to count a predetermined time and broadcasting a plurality of operation diagrams by a circle broadcast action based on the predetermined time, such as the on screen display (OSD) on a display unit (S31); using a selection module such as a press button or a wireless remote controller to perform a selection action on the foregoing broadcasted operation diagram (S32); driving the selected operation diagram to extend an internal menu (S33); and finally ending the whole procedure.

The internal menu includes the options of audio function, auto set, image set and menu setup. Further, the selection unit can used to drive the internal menu to display a detail menu by a layer display.

Figure 4:
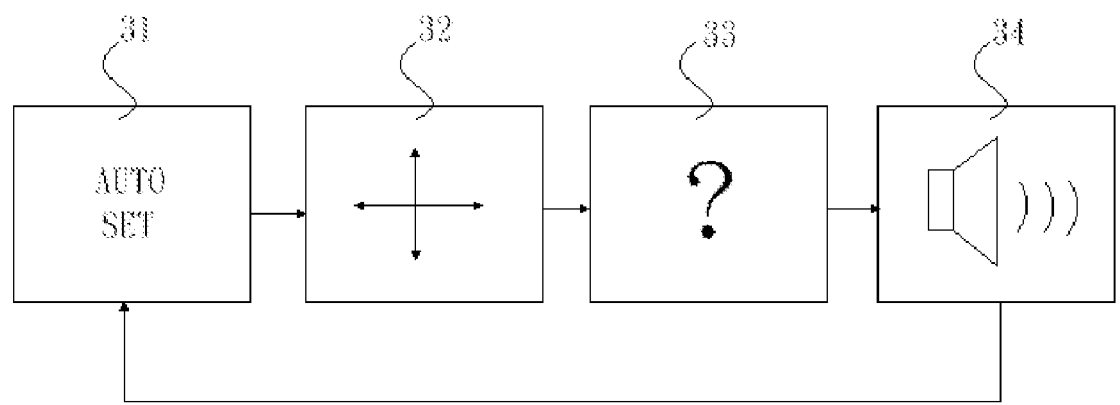
FIG. 4 is a schematic view of a circle broadcast action of an operation diagram based on a method for modulating an operation interface in accordance with the present invention.

Referring to FIG. 4 for a schematic view of a circle broadcast action of an operation diagram of a method for modulating an operation interface in accordance with the present invention, the operation diagram includes the diagrams of auto set 31, image set 32, menu setup 33 and audio function 34. The modulating operation interface changes the displayed operation diagram in a predetermined time 221, such as displaying the auto set 31 first, and then displaying the image set 32 after the predetermined time 221, and then displaying the setup menu 33 after the predetermined time 221, and then displaying an audio function 34 after the predetermined time 221, and then displaying an auto set 31 by a sound after the predetermined time 221, and so on. Therefore, a circle broadcast action is performed to display the operation diagrams.

Figure 5:
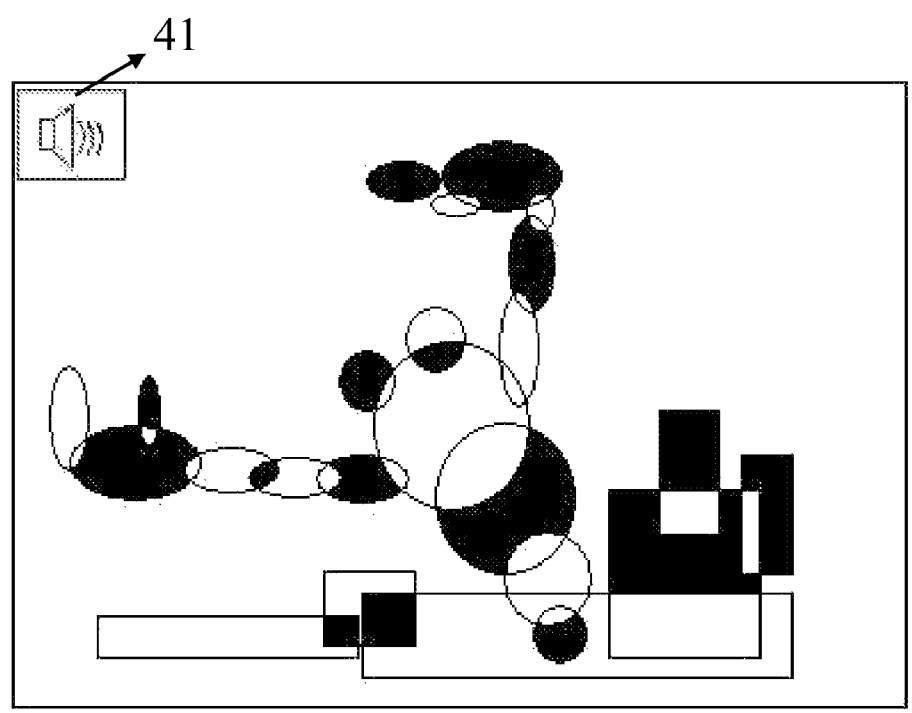
FIG. 5 is a flow chart of a method for modulating an operation interface in accordance with the present invention.
Figure 6:
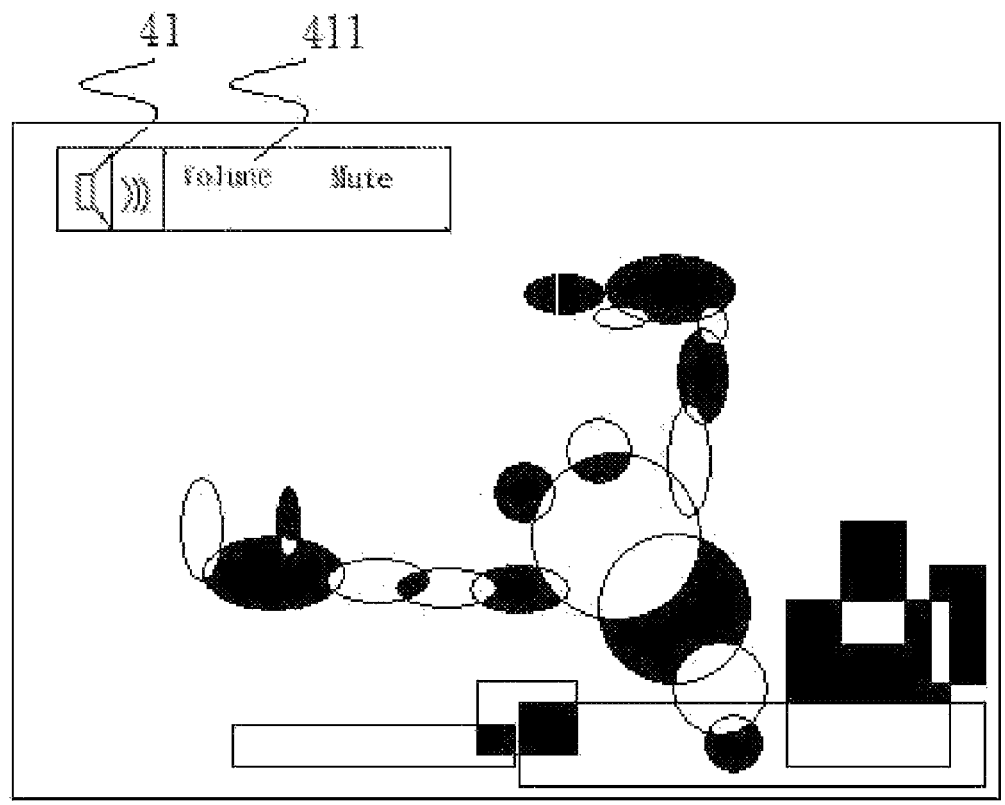
FIG. 6 is a schematic view of the operation of a method for modulating an operation interface in accordance with a preferred embodiment of the present invention.
Figure 7:
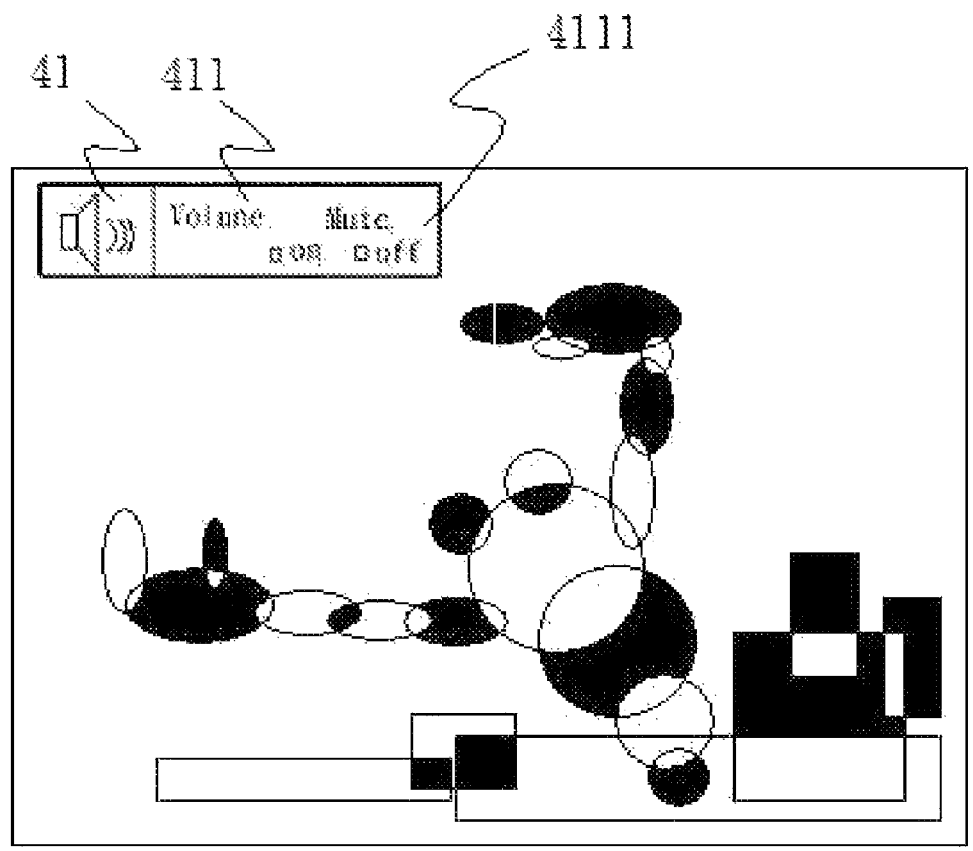
FIG. 7 is a schematic view of the operation of a method for modulating an operation interface in accordance with a preferred embodiment of the present invention.

FIGS. 5 to 7 show schematic views of modulating operation method in accordance with a preferred embodiment of the present invention. In FIG. 5, an example of operating an audio function is illustrated. If a user wants to select an operation diagram of an audio function, the user can perform a selection action by the selection unit 23 to enter into the operation diagram of the audio function 41 when the operation diagram of the audio function 41 is broadcasted. In FIG. 6, the operation diagram of the audio function 41 will extend an internal menu 411 of the audio function 41. The internal menu includes Volume and Mute. In FIG. 7, if a user uses the selection unit to select a desired internal menu 411, the internal menu 411 will extend a detail menu 4111 with a layer display for turning on or off the mute function. The detail menu 4111 further includes volume, mute on, and mute off as needed.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An operation interface, for a display apparatus, comprising:
    a display unit;
    a selection unit;
    a clock unit, for providing a time data; and
    a processor configured to receive a first selection action from the selection unit to activate a looped menu comprising a plurality of top level menu items, to control the display unit to individually display in sequence each of the plurality of top level menu items of the activated loop menu for a predetermined period of time according to the time data, to receive a second selection action from the selection unit to select a given one of the top level menu items when it is displayed on the display unit, and to control the display unit to display a child menu corresponding to the selected top level menu item, wherein the selected top level menu item and corresponding child menu are displayed simultaneously.

2. The modulating operation interface of claim 1, wherein said looped menu is an on screen display (OSD).

3. The modulating operation interface of claim 1, wherein said child menu includes an auto set option for automatically adjusting a horizontal position and a vertical position.

4. The modulating operation interface of claim 1, wherein said child menu includes an image set option for adjusting an image width and a sharpness.

5. The modulating operation interface of claim 1, wherein said child menu includes a setup menu option for setting a language and a display time.

6. The modulating operation interface of claim 1, wherein said child menu includes an audio function option for adjusting a volume and a mute.

7. The modulating operation interface of claim 1, wherein said selection unit is a press button disposed on said display apparatus.

8. The modulating operation interface of claim 1, wherein said selection unit is a wireless remote controller.

9. The modulating operation interface of claim 1, wherein said selection action drives said child menu to display a detail menu.

10. The modulating operation interface of claim 9, wherein said detail menu is a layer display.

11. A method displaying an operation interface, for a display apparatus, comprising the steps of:
    receiving a selection action from a selection unit to activate a looped menu comprising a plurality of top level menu items;
    individually displaying in sequence on a display unit each of the plurality of top level menu items for a predetermined period of time;
    receiving a selection action from the selection unit to select a given one of the top level menu item when it is displayed on the display unit; and
    displaying a child menu corresponding to the selected top level menu item, wherein the selected top level menu item and corresponding child menu are displayed simultaneously.

12. The method for modulating an operation interface of claim 11, further comprising the step of providing at least one on screen display as said looped menu.

13. The method for modulating an operation interface of claim 11, wherein said child menu includes an audio function option for adjusting a volume and a mute.

14. The method for modulating an operation interface of claim 11, wherein said child menu includes an auto set option for automatically adjusting a horizontal position and a vertical position.

15. The method for modulating an operation interface of claim 11, wherein said child menu includes an image set option for adjusting an image width and a sharpness.

16. The method for modulating an operation interface of claim 11, wherein said child menu includes a setup menu option for setting a language and a display time.

17. The method for modulating an operation interface of claim 11, wherein said selection unit is a press button disposed on said display apparatus.

18. The method for modulating an operation interface of claim 11, wherein said selection unit is a wireless remote controller.

19. The method for modulating an operation interface of claim 11, further comprising the step of using said selection unit to drive said child menu to display a detail menu.

20. The method for modulating an operation interface of claim 11, wherein said detail menu is a layer display.

* * * * *